R. W. CHRISTIAN.
MIXER AND PULVERIZER.
APPLICATION FILED APR. 21, 1917.

1,230,672.

Patented June 19, 1917.
2 SHEETS—SHEET 1.

WITNESSES

INVENTOR
ROBERT W. CHRISTIAN,
BY
ATTORNEYS

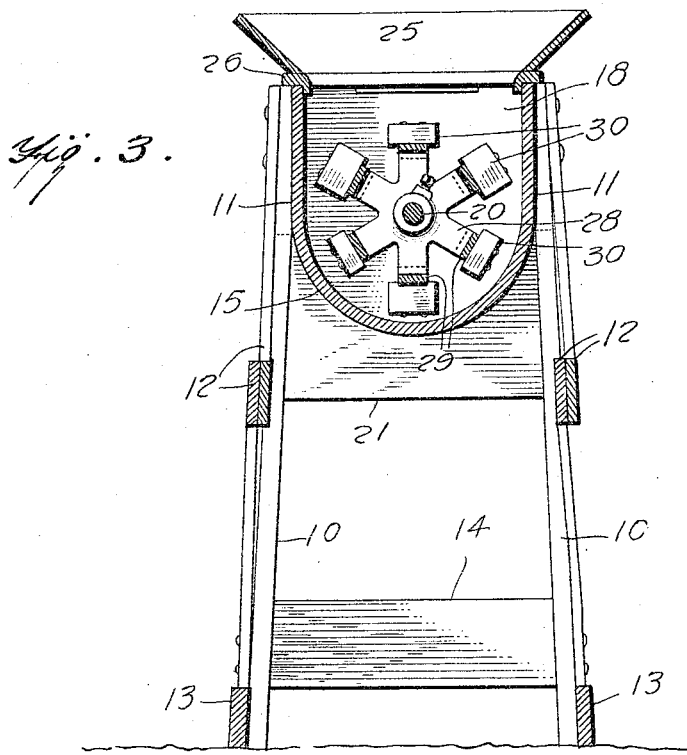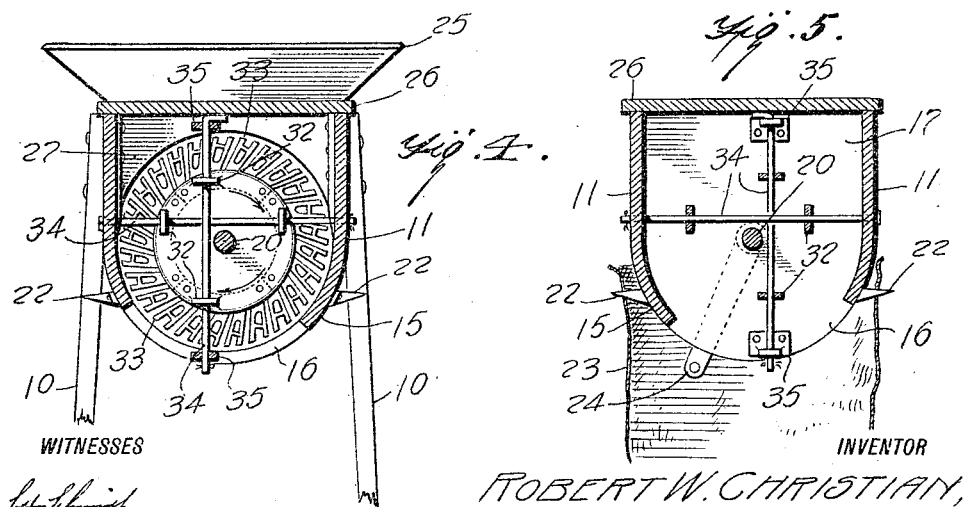

UNITED STATES PATENT OFFICE.

ROBERT WALL CHRISTIAN, OF MANCHESTER, NORTH CAROLINA.

MIXER AND PULVERIZER.

1,230,672.  Specification of Letters Patent.  Patented June 19, 1917.

Application filed April 21, 1917. Serial No. 163,570.

*To all whom it may concern:*

Be it known that I, ROBERT WALL CHRISTIAN, a citizen of the United States, and a resident of Manchester, in the county of Cumberland and State of North Carolina, have made certain new and useful Improvements in Mixers and Pulverizers, of which the following is a specification.

My present invention relates generally to mixing and pulverizing machines, and particularly to a machine of this type adapted to intermittently and thoroughly mix and pulverize fertilizer materials which have been either roughly mixed or spread in uniform layers in a suitable container, and afterward introduced into the machine, my primary object being the provision of a simple inexpensive machine of this type which will obviate the necessity of chains, gearing or other complicated parts.

A further object is the provision of a machine of this type embodying novel mixing and pulverizing means, the former of which acts as a feed for the latter, the pulverizer being yieldable under undue pressure at any point thereof.

Figure 1:
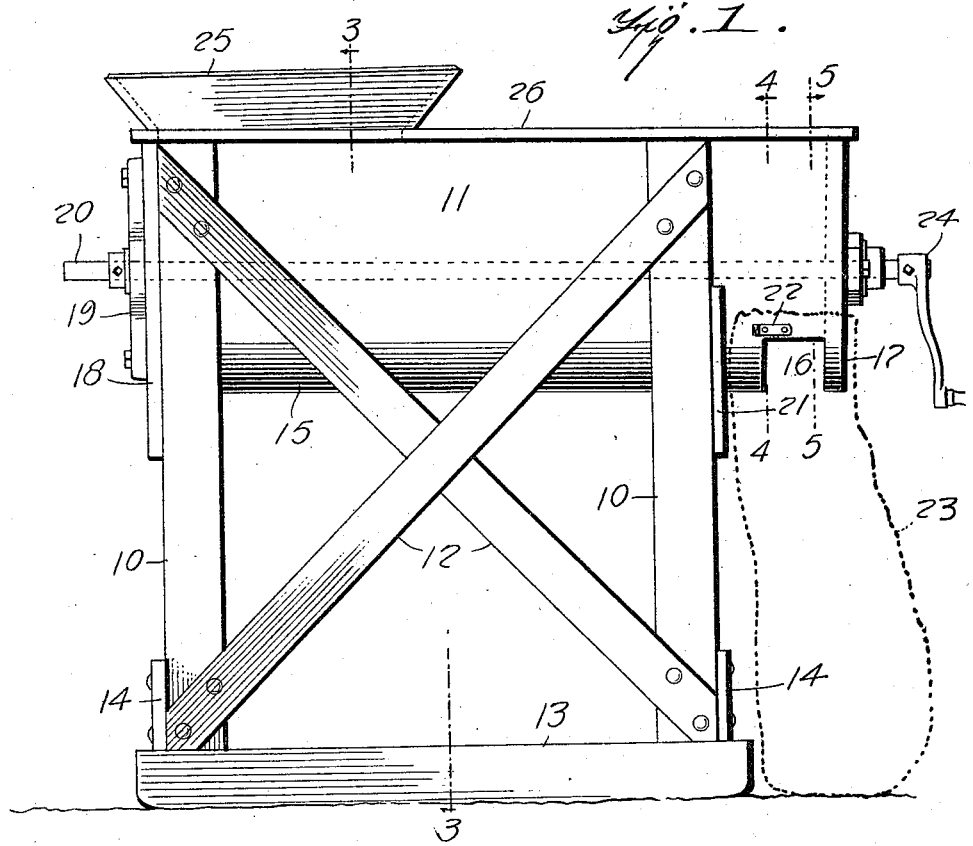
Figure 2:
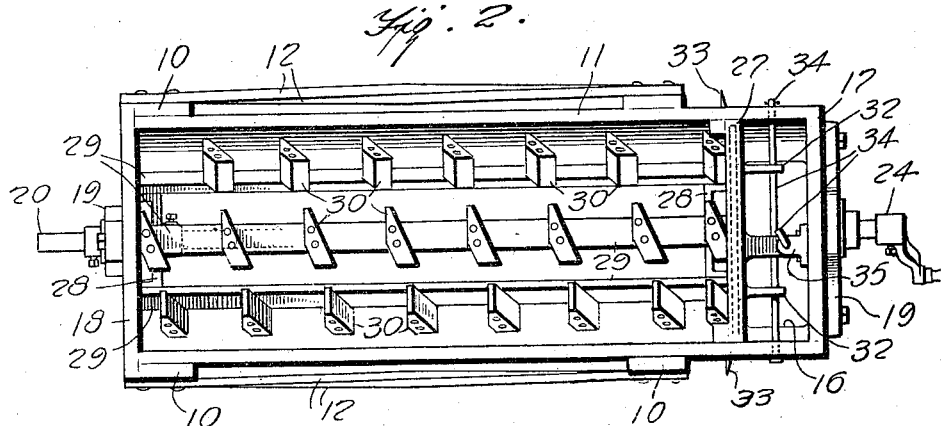

With these general objects in view, my invention resides in the construction, arrangement and operation of parts to be now described with reference to the accompanying drawings, forming a part of this specification, and wherein, Figure 1 is a side elevation of my improved machine, Fig. 2 is a top plan view thereof with the hopper and cover plate removed, Fig. 3 is a vertical cross section taken substantially on line 3—3 of Fig. 1, and, Figs. 4 and 5 are similar views taken respectively on lines 4—4 and 5—5 of Fig. 1.

Referring now to these figures, my invention includes a casing supported in elevated position and in downwardly and forwardly inclined relation within a main frame, including uprights 10 to which the side walls 11 of the casing are securely bolted, the uprights 10 being connected by side braces 12 diagonally disposed, and by lower longitudinal and transverse beams 13 and 14.

By particular reference to Fig. 1 it will be noted that the forward portion of the casing extends forwardly beyond the forward uprights 10 of the frame, and has its semi-circular base 15 provided with a transversely slotted feed opening 16 adjacent its front transverse wall 17; the latter of which and the rear wall 18 are provided with bearings 19 for the main shaft 20 extending longitudinally through the casing.

The casing is further supported by transverse saddle pieces 21, beneath and engaging the base 15 and secured to the uprights 10, and the base 15 is preferably provided at opposite sides of its feed opening 16 with bag clamps 22, which serve to hold a bag 23 in the position shown in Fig. 1 for the reception of the mixed and pulverized material fed outwardly through the opening 16, the forward end of the shaft 20 having a crank 24 by which the shaft and the mixing parts to be presently described are rotated.

At the upper rear end of the casing is a feed hopper 25 into which the material to be mixed and pulverized is initially introduced, the forward upper portion of the casing being closed by a cover plate 26 forwardly beyond the hopper 25.

As seen particularly in Fig. 4, the casing is partially divided adjacent its forward lower end by a transverse arch 27, the lower inner surface of which is curved to form with the inner curvature of the base 15 a substantially circular opening in which is mounted a pulverizing member constructed and yieldingly held against rotation in a manner to be presently described, the arch 27 thus forming a mixing chamber between the same and the rear wall 18 before mentioned, in which the mixing cylinder is disposed and secured upon the shaft 20. This mixing cylinder, as best seen by reference to Figs. 2 and 3, consists of a pair of end spiders 28, the extremities of the arms of which are angularly flanged and secured to the ends of longitudinally spaced slats 29, the latter thus arranged in an annular series for the reception thereon in longitudinally spaced relation of a series of mixing and feeding blocks 30, arranged in a helical line as regards the cylinder, and securely bolted to the slats in angular positions with respect to the latter.

The blocks 30 of the several slats around the cylinder are furthermore of varying thicknesses, the blocks of alternate slats being considerably thicker than the others, as plainly seen in Fig. 3, so that with the angular disposition of the blocks and their before mentioned arrangement with respect to the cylinder the material introduced through the hopper will not only be effectively and uniformly fed downwardly in the mixing chamber of the casing, but will be thoroughly and intermittently intermixed during its travel therein.

It will be noted from Fig. 2 that the blocks 30 adjacent the lower forward end of the mixing cylinder are all of the large size so that at a point adjacent the arch 27, a uniform feed movement will be imparted to the mixed material to force the latter through the pulverizer.

The pulverizer disposed in the circular opening formed as previously described by the arch 27 and the lower semi-circular base 15 of the casing includes a central circular plate or hub 31, having a central opening through which the shaft 20 extends, and provided with oppositely disposed and apertured lugs 32 projecting from its forward face and both vertically and horizontally alined, the plate 31 having peripheral openings by means of which the segmental pulverizing plates 33 are securely bolted to the hub 31, each of these plates having outstanding forked pulverizing arms, the extremities of which terminate in a circle concentric with the axis of the hub 31, and are held in spaced relation both to the arch 27 and the base 15 by means of supporting rods 34 projecting horizontally and vertically through the apertured lugs 32 at the forward side of hub 31, the ends of the horizontal rod 34 extending through apertures in the side walls 11 of the casing, and the extremities of the vertical rod 34 extending through apertured brackets 35 secured to the inner surface of the front wall 17 adjacent its upper and lower ends.

Thus in operation the material fed against the pulverizer by the mixing cylinder is forced through the arms of the pulverizer plates 33, and lumps are ground up in this manner, the spaced relation of the said pulverizer arms with respect to the lower surface of the arch 27 and the inner surface of the base 15 of the casing permitting trash and strings to pass through the pulverizer without clogging the same or interfering with its normal function.

It is furthermore apparent that the means supporting the pulverizer permit the latter to yield forwardly at any point upon undue pressure of the material.

I claim:—

1. A machine of the character described comprising a casing having a semi-circular base provided with a slotted discharge opening adjacent one end, an arch connecting the sides of the casing adjacent the discharge end thereof and forming with the base a circular opening, a pulverizing member disposed within said opening, a mixing member in the casing at one side of the arch opposite the feed opening, a shaft on which the mixer is secured extending through the said pulverizer, and journaled through the ends of the casing, and means for rotating said shaft.

2. A machine of the character described comprising a casing having a lower discharge opening adjacent one end and an otherwise imperforate wall, an internal member transversely thereof adjacent the discharge opening forming a mixing chamber between the same and the opposite end of the casing, a mixing member in said mixing chamber, a pulverizer adjacent the said internal member between the mixer and the feed opening and through which material is forced by said mixer, and means to yieldingly support the said pulverizer in spaced relation to the walls of the casing.

3. In a machine of the character described, a casing having a semi-circular base and an intermediate upper transverse arch forming with the inner surface of the base a circular opening, a stationary pulverizer within the said opening including a central plate, a series of segmental pulverizer plates secured to the said central plate and having outstanding pulverizing arms, means to support said pulverizer with the outer ends of its pulverizing arms in spaced relation to the adjacent portions of the casing, and the said arch, and means at one side of the pulverizer to feed material thereto.

4. In a machine of the character described a casing having a semi-circular base and an intermediate upper transverse arch forming with the inner surface of the base a circular opening, a stationary pulverizer within the said opening including a central plate, a series of segmental pulverizer plates secured to the said central plate and having outstanding pulverizing arms, and means to yieldingly hold said pulverizer in spaced relation to the adjacent portions of the casing and the said arch.

5. In a machine of the character described, a casing having a semi-circular base and an intermediate upper transverse arch forming with the inner surface of the base a circular opening, a stationary pulverizer within the said opening including a central plate, a series of segmental pulverizer plates secured to the said central plate and having outstanding pulverizing arms, means to yieldingly hold said pulverizer in spaced relation to the adjacent portions of the casing and the said arch, said means including vertical and transverse rods intermittently connected to the central plate of the pulverizer and having connection at their outer ends with portions of the casing.

ROBERT WALL CHRISTIAN.